(12) United States Patent
Tsai et al.

(10) Patent No.: US 12,314,028 B2
(45) Date of Patent: May 27, 2025

(54) INDUCTOR DRIVING DEVICE AND INDUCTOR DRIVING METHOD

(71) Applicant: Elite Semiconductor Microelectronics Technology Inc., Hsinchu (TW)

(72) Inventors: Ming-Fu Tsai, Hsinchu (TW); Sheng-Hung Hsu, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 159 days.

(21) Appl. No.: 18/235,361

(22) Filed: Aug. 18, 2023

(65) Prior Publication Data
US 2025/0060724 A1 Feb. 20, 2025

(51) Int. Cl.
*G05B 19/4062* (2006.01)
*G08B 3/00* (2006.01)

(52) U.S. Cl.
CPC ............ *G05B 19/4062* (2013.01); *G05B 2219/34429* (2013.01); *G08B 3/00* (2013.01)

(58) Field of Classification Search
CPC ...... G05B 19/4062; G05B 2219/34429; G08B 3/00
See application file for complete search history.

(56) References Cited

U.S. PATENT DOCUMENTS

| | | | |
|---|---|---|---|
| 8,054,609 B2 * | 11/2011 | Santos | H02H 7/0822 318/400.15 |
| 9,340,153 B2 * | 5/2016 | Kim | B60W 50/14 |
| 2015/0054637 A1 * | 2/2015 | Kim | B60R 16/0232 340/438 |
| 2019/0366975 A1 * | 12/2019 | Heffron | B60R 25/33 |
| 2020/0133227 A1 * | 4/2020 | Mikado | G05B 19/4062 |
| 2020/0341063 A1 * | 10/2020 | Bickel | G01R 27/16 |

FOREIGN PATENT DOCUMENTS

| | | |
|---|---|---|
| CN | 115211025 A | 10/2022 |
| JP | 5524752 | 6/2014 |
| TW | 201108592 A1 | 3/2011 |

\* cited by examiner

*Primary Examiner* — Rina I Duda
(74) *Attorney, Agent, or Firm* — Winston Hsu (57) ABSTRACT

An inductor driving device includes multiple switching elements and a control circuit, wherein an inductor is driven according to switching of the multiple switching elements. The control circuit is arranged to generate a control signal for controlling the multiple switching elements. In a first mode, the control signal has a constant frequency. In a second mode, the control circuit adjusts a frequency of the control signal and continuously changes a current direction of the inductor, to generate one of multiple audio signals through the inductor.

23 Claims, 6 Drawing Sheets

INDUCTOR DRIVING DEVICE AND INDUCTOR DRIVING METHOD

BACKGROUND OF THE INVENTION

1. Field of the Invention

The present invention is related to a servomotor, and more particularly, to an inductor driving device applied to the servomotor and an associated inductor driving method.

2. Description of the Prior Art

For a conventional servomotor, when the servomotor fails to operate, a user cannot perform a troubleshooting upon the servomotor according to any information. At this moment, the user needs to clearly inform a manufacturer of the operation status of the servomotor so that the manufacturer can guess the reason why it cannot run, and then find a solution to make the servomotor run normally. The above-mentioned process is quite time-consuming. As a result, an inductor driving device that can automatically inform the user of a current error status of the servomotor and an associated inductor driving method are urgently needed.

SUMMARY OF THE INVENTION

It is therefore one of the objectives of the present invention to provide an inductor driving device applied to a servomotor and an associated inductor driving method, to address the above-mentioned issues.

According to an embodiment of the present invention, an inductor driving device is provided. The inductor driving device comprises multiple switching elements and a control circuit, wherein an inductor is driven according to switching of the multiple switching elements. The control circuit is arranged to generate a control signal for controlling the multiple switching elements, wherein in a first mode, the control signal has a constant frequency; and in a second mode, the control circuit adjusts a frequency of the control signal and continuously changes a current direction of the inductor, to generate one of multiple audio signals through the inductor.

According to an embodiment of the present invention, an inductor driving method is provided. The inductor driving method comprises: generating a control signal to control multiple switching elements; and driving an inductor according to switching of the multiple switching elements; wherein in a first mode, the control signal has a constant frequency; and in a second mode, a frequency of the control signal is adjusted and a current direction of the inductor is continuously changed, to generate one of multiple audio signals through the inductor.

According to another embodiment of the present invention, an inductor driving device is provided. The inductor driving device comprises multiple switching elements and a control circuit, wherein an inductor is driven according to switching of the multiple switching elements. The control circuit is arranged to generate a control signal for controlling the multiple switching elements, wherein in a first mode, the control signal has a constant frequency; in a second mode, the control circuit adjusts a frequency of the control signal, to generate one of multiple audio signals through the inductor; and each of the multiple audio signals is composed by a Morse code.

One of the benefits of the present invention is that, the inductor driving device (which is applied to a servomotor) and the associated inductor driving method of the present invention can inform a user of a current alarm state of the servomotor by a corresponding audio signal, wherein the audio signal is generated through whistle of stator windings included in the servomotor, and is composed by a Morse code. In addition, when the operating mode of the servomotor is an alert mode, a current direction of the stator windings of the servomotor is continuously changed to keep the servomotor stationary. During the current direction changing operation, switching elements for driving the servomotor can operate alternately, which can reduce the heat consumption of the switching elements, and therefore improve the reliability of the switching elements.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
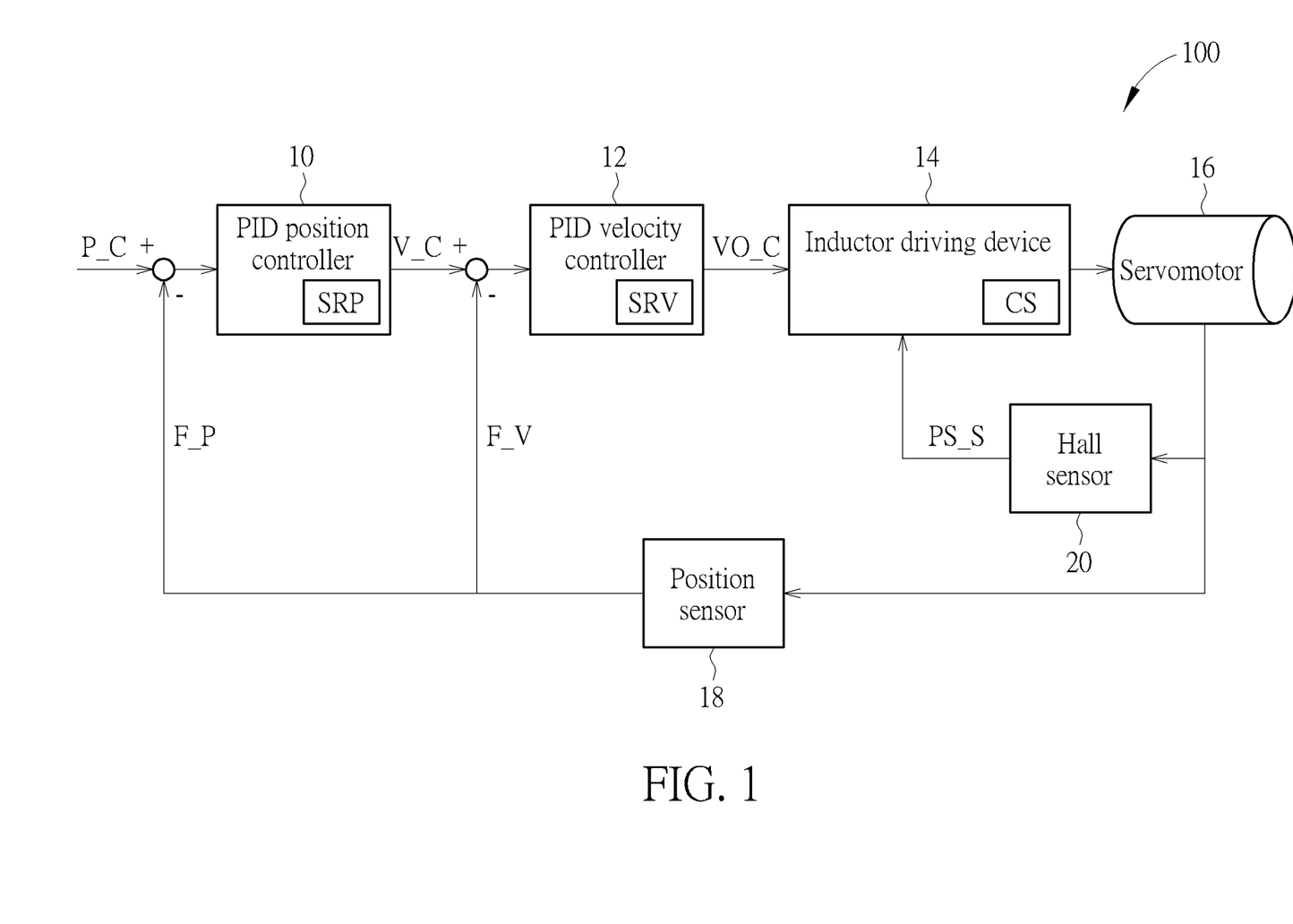
FIG. 1 is a diagram illustrating a motor system according to an embodiment of the present invention.

FIG. 1 is a diagram illustrating a motor system 100 according to an embodiment of the present invention. As shown in FIG. 1, the motor system 100 may include a proportional-integral-derivative (PID) position controller 10, a PID velocity controller 12, an inductor driving device 14, a servomotor 16, and a position sensor 18, wherein the position sensor 18 is arranged to perform a closed-loop control for the servomotor 16. Examples of the servomotor 16 may include, but are not limited to: a three-phase alternating current (AC) induction motor, a brushless direct current (DC) motor, a brushed DC motor, and a switched reluctance motor. For better comprehension, in this embodiment, the servomotor 16 may be a three-phase brushless DC motor. Under a condition that the servomotor 16 is the three-phase brushless DC motor, the motor system 100 may further include a hall sensor 20, wherein the hall sensor 20 may be arranged to generate a phase sequence signal PS_S to the inductor driving device 14 for performing a commutation upon a stator of the servomotor 16 through the inductor driving device 14. In some embodiments, the servomotor 16 may be a brushed motor, and the forward/reverse rotation of the servomotor 16 may be controlled by the sign of a voltage (or a current) input to the servomotor 16.

The PID position controller 10 may be arranged to receive a position command P C, receive a feedback position F P of the servomotor 16 (more particularly, a rotor of the servomotor 16) from the position sensor 18, subtract the feedback position F P from the position command P C to generate a subtract result SRP, and convert the subtract result SRP into a velocity command V C. The PID velocity controller 12 may be arranged to receive the velocity command V C from the PID position controller 10, receive a feedback velocity F V of the servomotor 16 from the position sensor 18, subtract the feedback velocity F V from the velocity command V C to generate a subtract result SRV, and convert the subtract result SRV into a voltage command VO_C. The inductor driving device 14 may be arranged to generate a control signal CS according to the voltage command VO_C for driving an inductor (e.g. stator windings) included in the servomotor 16. In addition, in response to the servomotor 16 being in an alarm state, the inductor driving device 14 may adjust a frequency of the control signal CS and continuously change a current direction of a current flowing through the stator windings, to generate one of multiple audio signals by whistle of the inductor (e.g. the stator windings).

Figure 2:
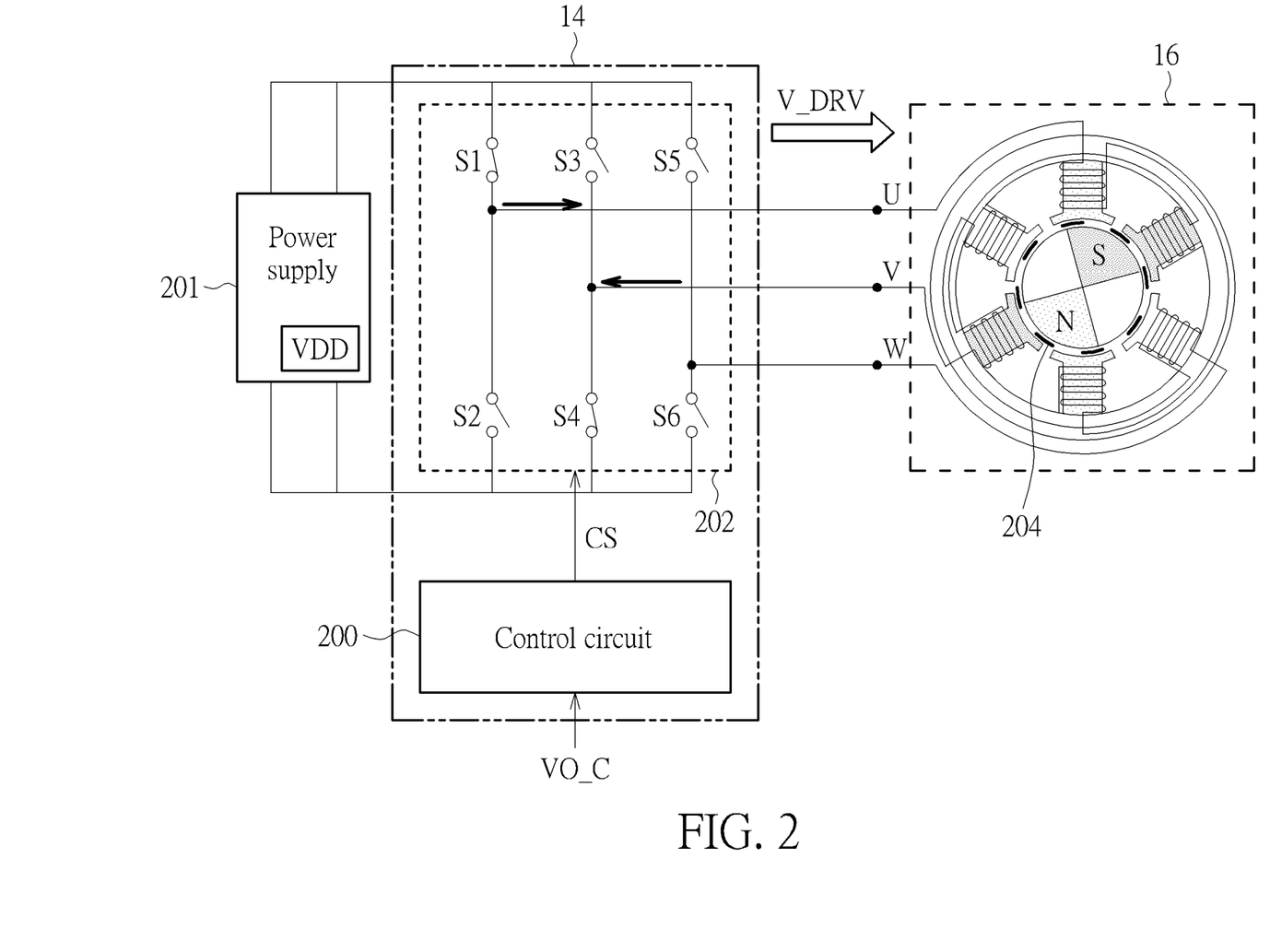
FIG. 2 is a diagram illustrating a configuration between the inductor driving device and the servomotor shown in FIG. 1 according to an embodiment of the present invention.

In detail, please refer to FIG. 2 that illustrates a configuration between the inductor driving device 14 and the servomotor 16 shown in FIG. 1 according to an embodiment of the present invention. As shown in FIG. 2, the inductor driving device 14 may include a control circuit 200 and a switching circuit 202, wherein the switching circuit 202 may include multiple switching elements S1-S6, and each of the switching elements S1-S6 may be implemented by a transistor. In addition, the switching elements S1-S6 may receive a supply voltage VDD from a power supply 201, wherein the power supply 201 may be implemented by a battery. The servomotor 16 may include a rotor 204 and a stator. The rotor 204 may be a magnet. The stator may be a three phase stator winding, including a stator winding U, a stator winding V, and a stator winding The control circuit 200 may be arranged to generate the control signal CS according to the voltage command VO_C to control turn-on and turn-off of the switching elements S1-S6. In response to switching of the switching elements S1-S6, a driving voltage V_DRV may be generated for driving the servomotor 16 (more particularly, the stator windings U, V, and W of the servomotor 16). That is, a magnetic field angle (e.g. an angle of the rotor 204) of the servomotor 16 is changed according to the driving voltage V_DRV, to make the servomotor 16 run. After the servomotor 16 is driven by the driving voltage V_DRV, in response to the servomotor 16 running smoothly, an operating mode of the servomotor 16 is a normal mode. Assume that the operating mode of the servomotor 16 is initially the normal mode.

In the normal mode, the control signal CS has a constant frequency (e.g. 20 kHz), and a duty cycle of the control signal CS is adjusted to control the switching of the switching elements S1-S6. For example, the control signal CS may be a pulse width modulation (PWM) signal. In addition, the angle of the rotor 204 is sequentially changed to 0 degrees, 60 degrees, 120 degrees, 180 degrees, 240 degrees, 300 degrees, and back to 0 degrees, 60 degrees, . . . , and so on. Specifically, in the beginning, under a condition that the angle of the rotor 204 is changed to 0 degrees, the switching elements S1 and S4 are turned on and the switching elements S2, S3, S5, and S6 are turned off (as shown in FIG. 2). In this condition, the current flows into the stator winding U through the switching element S1, flows out of the stator winding V, and flows back to the power supply 201 through the switching element S4. Under a condition that the angle of the rotor 204 is changed from 0 degrees to 60 degrees, the switching elements S1 and S6 are turned on, the switching elements S2, S3, S4, and S5 are turned off, and the current flows into the stator winding U through the switching element S1, flows out of the stator winding W, and flows back to the power supply 201 through the switching element S6. Under a condition that the angle of the rotor 204 is changed from 60 degrees to 120 degrees, the switching elements S3 and S6 are turned on, the switching elements S1, S2, S4, and S5 are turned off, and the current flows into the stator winding V through the switching element S3, flows out of the stator winding W, and flows back to the power supply 201 through the switching element S6.

Under a condition that the angle of the rotor 204 is changed from 120 degrees to 180 degrees, the switching elements S3 and S2 are turned on, the switching elements S1, S4, S5, and S6 are turned off, and the current flows into the stator winding V through the switching element S3, flows out of the stator winding U, and flows back to the power supply 201 through the switching element S2. Under a condition that the angle of the rotor 204 is changed from 180 degrees to 240 degrees, the switching elements S5 and S2 are turned on, switching elements S1, S3, S4, and S6 are turned off, and the current flows into the stator winding W through the switching element S5, flows out of the stator winding U, and flows back to the power supply 201 through the switching element S2. Under a condition that the angle of the rotor 204 is changed from 240 degrees to 300 degrees, the switching elements S5 and S4 are turned on, the switching elements S1, S2, S3, and S6 are turned off, and the current flows into the stator winding W through the switching element S5, flows out of the stator winding V, and flows back to the power supply 201 through the switching element S4.

When the operating mode of the servomotor 14 is the normal mode, the control circuit 200 may implement an algorithm by loading and executing program code to determine whether the servomotor 16 is in one of multiple alarm states ES 1-ES M, wherein "M" is an integer greater than 1 (e.g. M=4). In an alarm state ES 1, a voltage corresponding to the voltage command VO_C exceeds a voltage range of the servomotor 16. In an alarm state ES 2, the rotor 204 of the servomotor 16 is blocked. In an alarm state ES 3, a temperature of the inductor driving device 14 exceeds an operating temperature of the switching elements S1-S6. In an alarm state ES 4, the position command P C input to the motor system 100 (more particularly, the servomotor 16) is missing. The alarm states ES 1-ES 4 are for illustration only, and the present invention is not limited thereto. It should be noted that the number of the alarm states ES 1-ES M and the types of the alarm states ES 1-ES M may be adjusted depending upon actual design considerations.

In response to the servomotor 16 being in one of the alarm states ES 1-ES M, the operating mode of the servomotor 16 is switched from the normal mode to an alert mode. In the alert mode, the control circuit 200 may adjust a frequency of the control signal CS and keep a duty cycle of the control signal CS unchanged, to generate one of multiple audio signals AS_1-AS_M through whistle of the inductor (e.g. the stator windings U, V, and W included in the servomotor 16), wherein the control signal CS may be a pulse frequency modulation (PFM) signal, and the audio signals AS_1-AS_M correspond to the alarm states ES_1-ES M, respectively. For example, the frequency of the control signal CS may be decreased from the constant frequency (e.g. 20 kHz) in the normal mode to a low frequency audible to the human ear (e.g. 5 KHz).

For each of the alarm states ES_1-ES M, an alarm of the servomotor 16 will occur. As a result, under a condition that the servomotor 16 is in the normal mode, the control circuit 200 may be further arranged to determine whether any alarm of the servomotor 16 occurs. In response to the alarm of the servomotor 16 occurring, the control circuit 200 may determine which of the alarm states ES_1-ES M a current alarm state of the servomotor 16 is, and generate an audio signal which is indicative of the current alarm state and is one of the audio signals AS_1-AS_M by adjusting the frequency of the control signal CS.

It should be noted that each of the audio signals AS_1-AS_M may be composed by a Morse code. In this embodiment, each of the audio signals AS_1-AS_M is a combination of long and short tones. For example, in a case of the alarm states ES_1-ES_8 (i.e. M=8), 8 combinations of three sounds with long and short tones (e.g. 3 long tones, 2 long tones+1 short tones, 1 long tone+2 short tones, 1 long tones+1 short tones+1 long tone, 1 short tone+1 long tone+1 short tone, 1 short tone+2 long tones, 2 short tones+1 long tone, and 3 short tones) can be utilized to generate the audio signals AS_1-AS_8, respectively, for notifying the user of the current alarm state of the servomotor 16, wherein 8 combinations correspond to the alarm states ES_1-ES_8, respectively, a first time terminal without sound is between each sound to allow the user to distinguish between long and short tones, each combination will be continuously repeated, in the process of combination repetition, adjacent combinations will be separated by a second time interval without sound, and the second time interval may be longer than the first time interval. For example, under a condition that the control circuit 200 generates the PFM signal to make a combination of 1 lone tone+2 short tones through the stator windings U, V, and W of the servomotor 16, a lone tone with 1 second, the first time interval with 0.2 seconds, a short tone with 0.2 seconds, the first time interval with 0.2 seconds, a short tone with 0.2 seconds, the second time interval with 1.2 seconds, the next combination with same sound (i.e. 1 lone tone+2 short tones), and so on, can be sequentially made. For another example, in a case of the alarm states ES_1-ES_16 (i.e. M=16), 16 combinations of four sounds with long and short tones can be utilized to generate the audio signals AS_1-AS_16, respectively. That is, under a condition that a number of sounds for combination is n, the number of alarm states ES_1-ES M can be $2^n$ (i.e. M=$2^n$).

In some embodiments, the amplitude of the sound can be changed without changing the frequency of the control signal CS, to classify the alarm state of the servomotor 16 by using a sound combination with large and small sounds that is composed by the Morse code. Since the operations of the sound combination with large and small sounds are similar to that of the sound combination with long and short tones, similar descriptions are not repeated in detail here for brevity.

Figure 3:
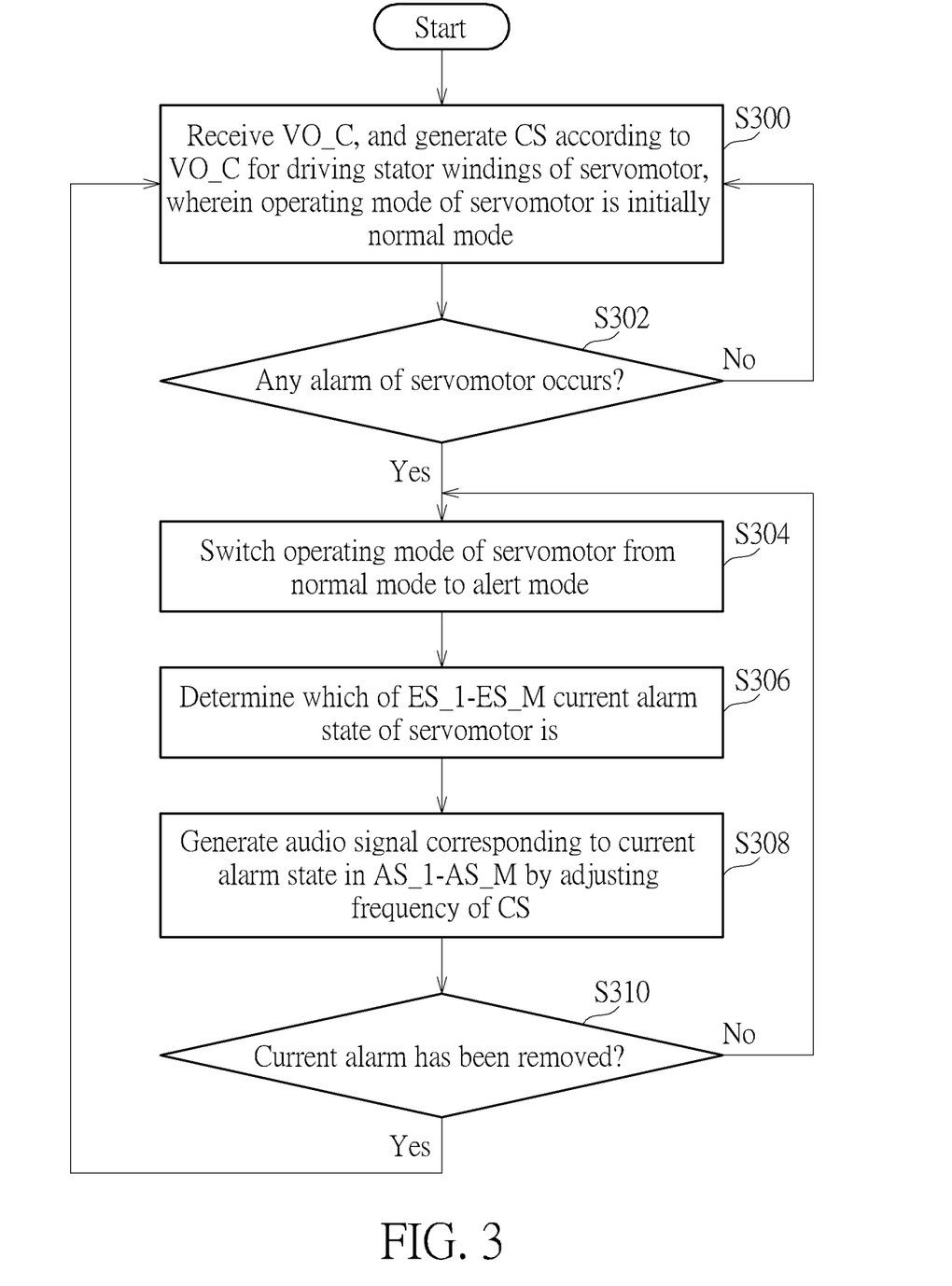
FIG. 3 is a flow chart of switching between a normal mode and an alert mode of the servomotor shown in FIG. 1 according to an embodiment of the present invention.

FIG. 3 is a flow chart of switching between the normal mode and the alert mode of the servomotor 16 shown in FIG. 1 according to an embodiment of the present invention. Provided that the result is substantially the same, the steps are not required to be executed in the exact order shown in FIG. 3. For example, the switching operation shown in FIG. 3 may be employed by the inductor driving device 14 shown in FIG. 1 (more particularly, the control circuit 200 shown in FIG. 2).

In Step S300, after receiving the voltage command VO_C, the control circuit 200 generates the control signal CS according to the voltage command VO_C for driving the stator windings U, V, and W of the servomotor 16, wherein the operating mode of the servomotor 16 is initially the normal mode.

In Step S302, the control circuit 200 determines whether any alarm of the servomotor 16 occurs. If yes, step S304 is entered; if no, Step S300 is entered.

In Step S304, the operating mode of the servomotor 16 is switched from the normal mode to the alert mode.

In Step S306, the control circuit 200 determines which of the alarm states ES_1-ES_M a current alarm state of the servomotor 16 is.

In Step S308, the control circuit 200 generates an audio signal corresponding to the current alarm state in the audio signals AS_1-AS_M by adjusting the frequency of the control signal CS.

In Step S310, the control circuit 200 determines whether the current alarm has been removed (e.g. after the user performs a troubleshooting upon the servomotor 16 according to the corresponding audio signal, the servomotor 16 runs normally). If yes, step S300 is entered; if no, Step S304 is entered.

Since a person skilled in the pertinent art can readily understand details of the steps shown in FIG. 3 after reading the above paragraphs, further description is omitted here for brevity.

When the operating mode of the servomotor 16 is the alert mode, during a process of changing the switching mode of the switching elements S1-S6 (e.g. changing from a switching mode where the current flows from the stator winding U to the stator winding V to another switching mode where the current flows from the stator winding U to the stator winding W) and/or generating the audio signals AS_1-AS_M, the servomotor 16 may rotate, which may cause damage to the servomotor 16. In order to address this issue, the control circuit 200 may continuously change a current direction of the stator windings U, V, and W of the servomotor 16 to keep the servomotor 16 stationary in the alert mode.

Specifically, the control circuit 200 may change the current direction with 180-degree reversal repeatedly, to make the current direction change between a positive direction and a negative direction alternately. Take the rotor angle of the servomotor 16 being 0 degrees as an example. When the current flows from the stator winding U to the stator winding V (which is regarded as a positive direction of the current direction), the magnetic field direction of the servomotor 16 is changed to the N pole. In response to the servomotor 16 being about to move towards the N pole but has not yet started to move, the control circuit 200 changes the current direction with 180-degree reversal so that the current flows from the stator winding V to the stator winding U (which is regarded as a negative direction of the current direction; i.e. the current direction is changed from the positive direction to the negative direction, and the rotor angle of the servomotor 16 is changed from 0 degrees to 180 degrees), and the magnetic field direction of the servomotor 16 is changed to the S pole. In response to the servomotor 16 being about to move towards the S pole but has not yet started to move, the control circuit 200 changes the current direction with 180-degree reversal so that the current flows from the stator winding U to the stator winding V (i.e. the current direction is changed from the negative direction to the positive direction, and the rotor angle of the servomotor 16 is changed from 180 degrees to 0 degrees), and the magnetic field direction of the servomotor 16 is changed to the N pole. By repeatedly performing the above operations (i.e. the current direction is changed between the positive direction and the negative direction alternately), the servomotor 16 will not rotate in the alert mode.

In this embodiment, the current direction changing operation for the servomotor 16 in the alert mode can be divided into 6 cases (e.g. cases 1-6). In case 1, the rotor angle of the servomotor 16 is 0 degrees (i.e. the current flows from the stator winding U to the stator winding V) before the alert mode is entered. The control circuit 200 may repeatedly change the rotor angle of the servomotor 16 between 0 degrees and 180 degrees (i.e. the current flows from the stator winding V to the stator winding U) according to the control signal CS. In case 2, the rotor angle of the servomotor 16 is 60 degrees (i.e. the current flows from the stator winding U to the stator winding W) before the alert mode is entered. The control circuit 200 may repeatedly change the rotor angle of the servomotor 16 between 60 degrees and 240 degrees (i.e. the current flows from the stator winding W to the stator winding U) according to the control signal CS. In case 3, the rotor angle of the servomotor 16 is 120 degrees (i.e. the current flows from the stator winding V to the stator winding W) before the alert mode is entered. The control circuit 200 may repeatedly change the rotor angle of the servomotor 16 between 120 degrees and 300 degrees (i.e. the current flows from the stator winding W to the stator winding V) according to the control signal CS. For cases 4-6, the rotor angle of the servomotor 16 is 180 degrees, 240 degrees, and 300 degrees, respectively, and may correspond to cases 1-3, respectively. For brevity, operations of cases 4-6 are not repeated in detail here.

Under a condition that the current direction is changed between the positive direction and the negative direction alternately, the switching elements S1-S6 may operate alternately. Take the above-mentioned case 1 as an example. When the rotor angle of the servomotor 16 is 0 degrees, the switching elements S1 and S4 are turned on. When the rotor angle of the servomotor 16 is 180 degrees, the switching elements S2 and S3 are turned on. By making the switching elements S1-S6 operate alternately, the heat consumption of the switching elements S1-S6 can be reduced, which can improve the reliability of the switching elements S1-S6.

In some embodiments, under a condition that the servomotor 16 is a brushed DC motor, the control circuit 200 may also change the current direction between the positive direction and the negative direction alternately, to make the servomotor 16 not rotate in the alert mode. For brevity, further descriptions for these embodiments are not repeated in detail here.

Figure 4:
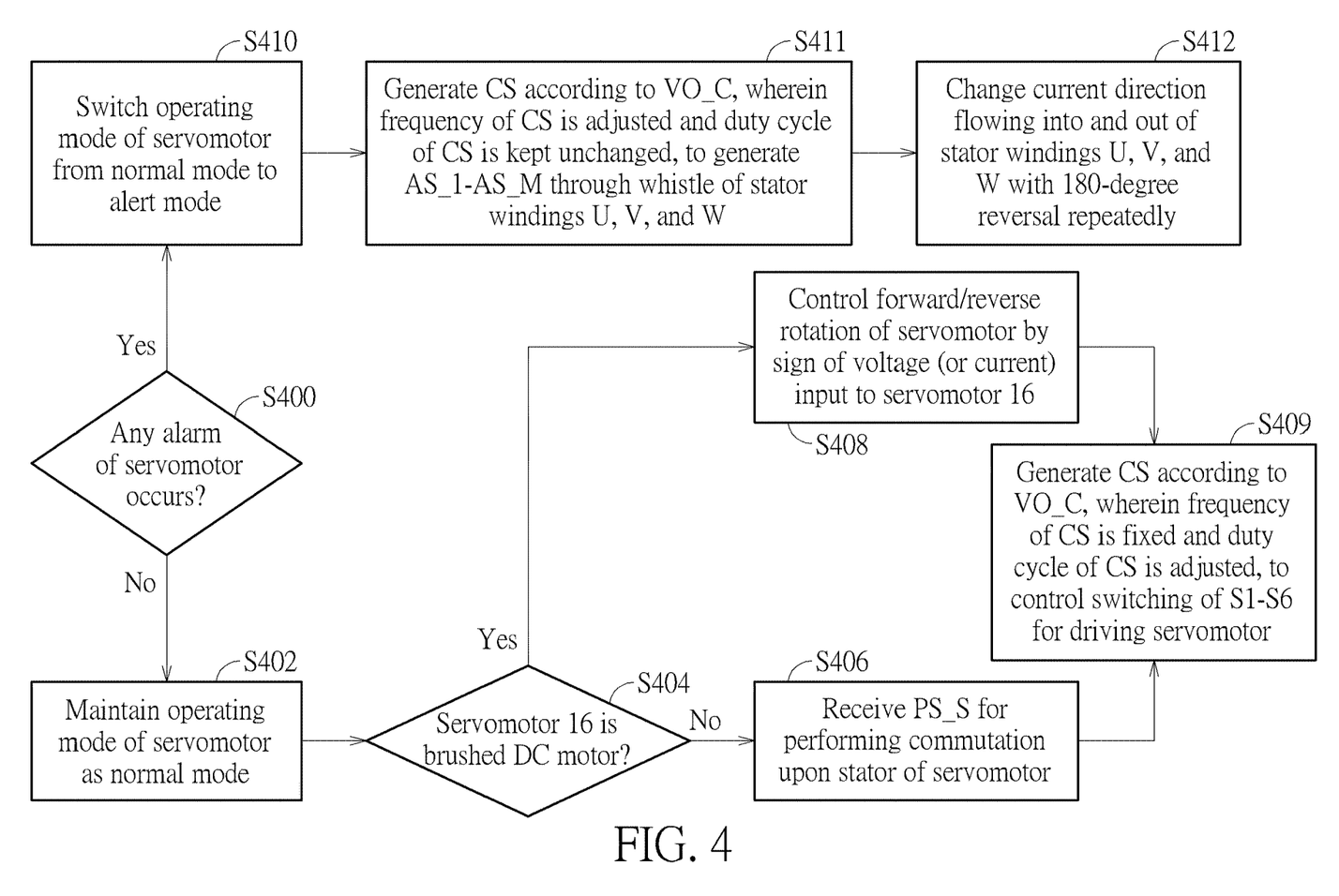
FIG. 4 is a flow chart of operations of the control circuit shown in FIG. 2 according to an embodiment of the present invention.

FIG. 4 is a flow chart of operations of the control circuit 200 according to an embodiment of the present invention. Provided that the result is substantially the same, the steps are not required to be executed in the exact order shown in FIG. 4. In this embodiment, assume that the operating mode of the servomotor 16 is initially the normal mode.

In Step S400, it is determined whether any alarm of the servomotor 16 occurs. If yes, step S410 is entered; if no, Step S402 is entered.

In Step S402, the operating mode of the servomotor 16 is maintained as the normal mode.

In Step S404, it is determined whether the servomotor 16 is a brushed DC motor. If yes, Step S408 is entered; if no, Step S406 is entered.

In Step S406 (e.g. the servomotor 16 may be a brushless DC motor), the phase sequence signal PS_S is received for performing a commutation upon the stator windings U, V, and W of the servomotor 16.

In Step S408 (e.g. the servomotor 16 is a brushed DC motor), the forward/reverse rotation of the servomotor 16 is controlled by the sign of the voltage (or the current) input to the servomotor 16.

In Step S409, the control signal CS is generated according to the voltage command VO_C, wherein the frequency of the control signal CS is fixed (e.g. 20 KHz) and the duty cycle of the control signal CS is adjusted, to control the switching of the switching elements S1-S6 for driving the servomotor 16 (more particularly, the stator windings U, V, and W). For example, the control signal CS may be a PWM signal.

In Step S410, the operating mode of the servomotor 16 is switched from the normal mode to the alert mode.

In Step S411, the control signal CS is generated according to the voltage command VO_C, wherein the frequency of the control signal CS is adjusted and the duty cycle of the control signal CS is kept unchanged, to generate the audio signals AS_1-AS_M through whistle of the inductor (e.g. the stator windings U, V, and W), and the control signal CS may be a PFM signal. For example, the frequency of the control signal CS may be decreased from the constant frequency (e.g. 20 kHz) in the normal mode to a low frequency audible to the human ear (e.g. 5 KHz).

In Step S412, the current direction of the current flowing through the stator windings U, V, and W is changed with 180-degree reversal repeatedly, to make the current direction change between a positive direction and a negative direction alternately.

Since a person skilled in the pertinent art can readily understand details of the steps shown in FIG. 4 after reading the above paragraphs, further description is omitted here for brevity.

Figure 5:
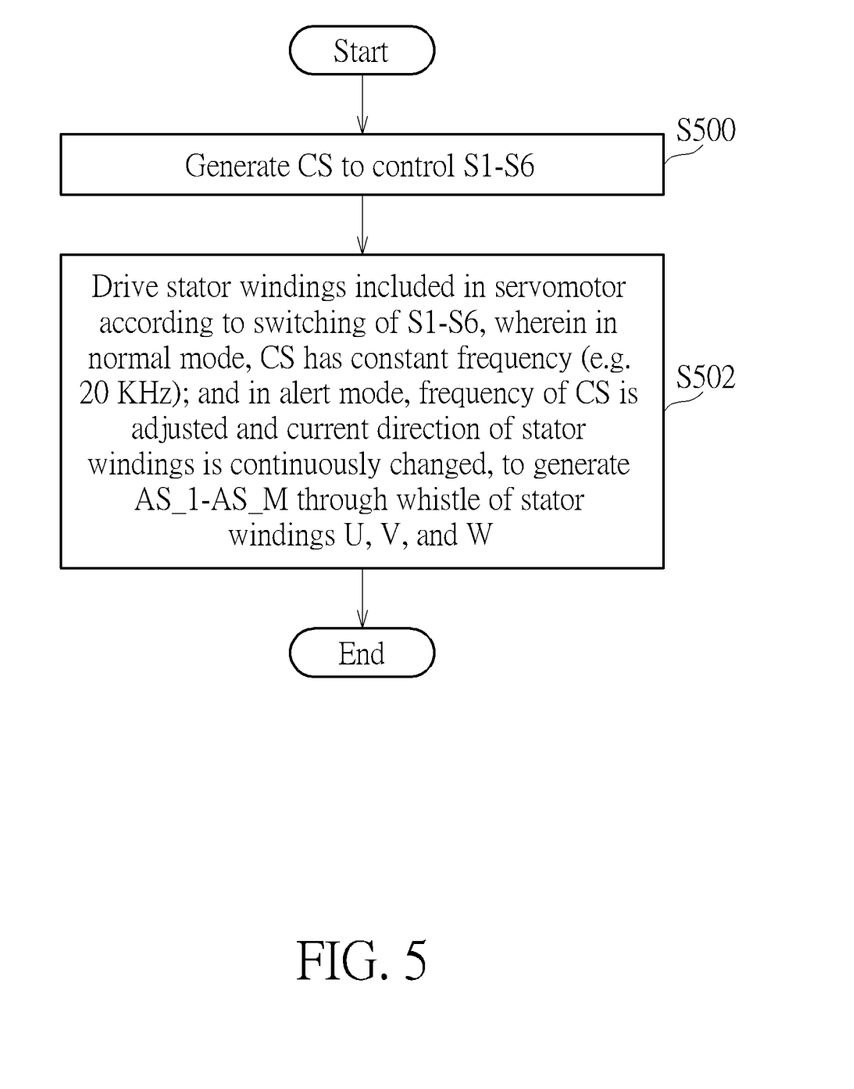
FIG. 5 is a flow chart of an inductor driving method according to an embodiment of the present invention.

FIG. 5 is a flow chart of an inductor driving method according to an embodiment of the present invention. Provided that the result is substantially the same, the steps are not required to be executed in the exact order shown in FIG. 5. For example, the inductor driving method shown in FIG. 5 may be employed by the inductor driving device 14 shown in FIG. 1 (more particularly, the control circuit 200 shown in FIG. 2).

In Step S500, the control signal CS is generated to control the switching elements S1-S6.

In Step S502, the inductor (e.g. the stator windings U, V, and W) is driven according to switching of the switching elements S1-S6, wherein in the normal mode, the control signal CS has a constant frequency (e.g. 20 KHz); and in the alert mode, the frequency of the control signal CS is adjusted (e.g. decreased as a low frequency audible to the human ear, such as 5 KHz) and the current direction of the stator windings U, V, and W is continuously changed, to generate the audio signals AS_1-AS_M through whistle of the stator windings U, V, and W.

Since a person skilled in the pertinent art can readily understand details of the steps shown in FIG. 5 after reading the above paragraphs, further description is omitted here for brevity.

Figure 6:
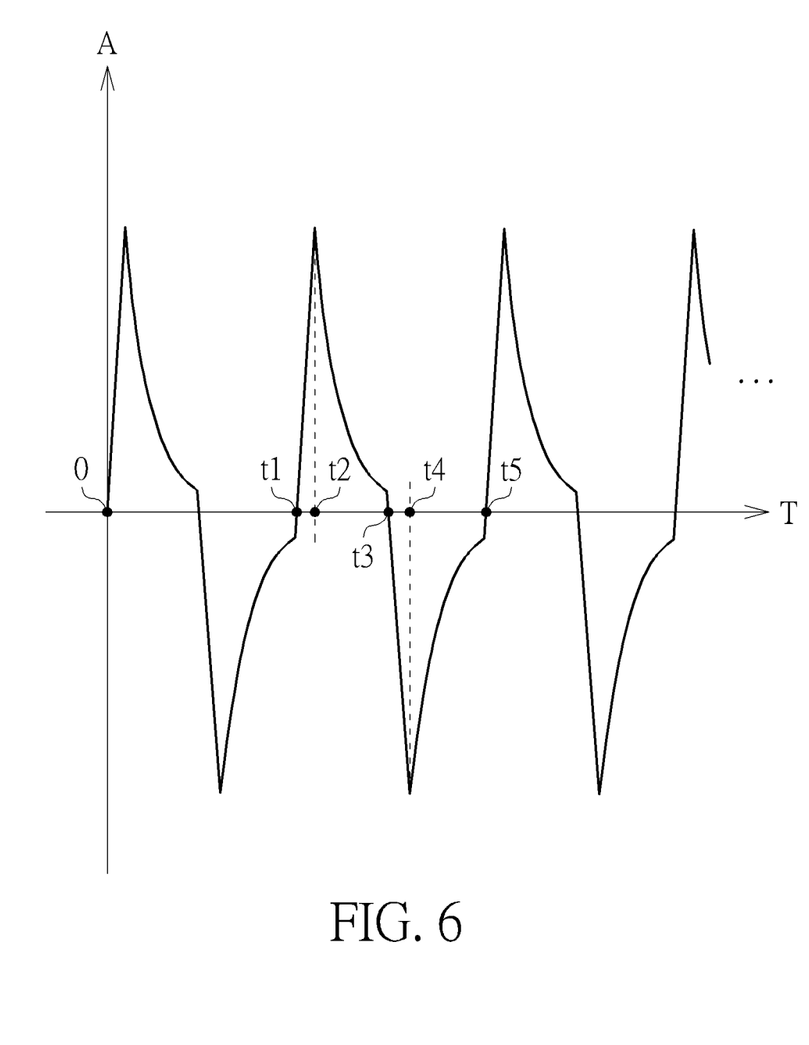
FIG. 6 is a diagram illustrating an example of variation of the current in the alert mode of the servomotor shown in FIG. 1 according to an embodiment of the present invention.

FIG. 6 is a diagram illustrating an example of variation of the current in the alert mode of the servomotor 16 shown in FIG. 1 according to an embodiment of the present invention, wherein the horizontal axis may represent time (denoted by "T"), and the vertical axis may represent amplitude of the current (denoted by "A"). In this embodiment, the above-mentioned case 1 (i.e. the rotor angle of the servomotor 16 is repeatedly changed between 0 degrees and 180 degrees) is taken as an example. As shown in FIG. 6, during a time interval between a time point t1 and a time point t2, the current flows from stator winding U to the stator winding V, and the current is continuously accumulated in the positive direction at the stator winding V. During a time interval between the time point t2 and a time point t3, the current at the stator winding V dissipates gradually. During a time interval between the time point t3 and a time point t4, the current flows from stator winding V to the stator winding U, and the current is continuously accumulated in the negative direction at the stator winding U. During a time interval between the time point t4 and a time point t5, the current at the stator winding U dissipates gradually. In this way, the current direction is changed with 180-degree reversal repeatedly, to make the current direction change between the positive direction and the negative direction alternately and therefore make the rotor angle of the servomotor repeatedly changed between 0 degrees and 180 degrees. As a result, the servomotor can keep stationary in the alert mode. The current variation of the above-mentioned cases 2-6 is similar to that of the case 1, further descriptions are not repeated in detail here for brevity.

In summary, the inductor driving device (which is applied to a servomotor) and the associated inductor driving method of the present invention can inform a user of a current alarm state of the servomotor by a corresponding audio signal, wherein the audio signal is generated through whistle of stator windings included in the servomotor, and is composed by a Morse code. In addition, when the operating mode of the servomotor is an alert mode, a current direction of the stator windings of the servomotor is continuously changed to keep the servomotor stationary. During the current direction changing operation, switching elements for driving the servomotor can operate alternately, which can reduce the heat consumption of the switching elements, and therefore improve the reliability of the switching elements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inductor driving device, comprising:
   multiple switching elements, wherein an inductor is driven according to switching of the multiple switching elements;
   a control circuit, arranged to generate a control signal for controlling the multiple switching elements;
   wherein in a first mode, the control signal has a constant frequency; and in a second mode, the control circuit adjusts a frequency of the control signal and continuously changes a current direction of the inductor, to generate one of multiple audio signals through the inductor.

2. The inductor driving device of claim 1, wherein the inductor is included in a servomotor.

3. The inductor driving device of claim 2, wherein an operating mode of the servomotor is initially the first mode; in response to the servomotor being in one of multiple alarm states, the operating mode of the servomotor is switched from the first mode to the second mode; and the multiple audio signals correspond to the multiple alarm states, respectively.

4. The inductor driving device of claim 3, wherein the control circuit is further arranged to determine whether an alarm of the servomotor occurs; and in response to the alarm of the servomotor occurring, the control circuit determines which of the multiple alarm states an alarm state of the servomotor is, and generate an audio signal corresponding to the alarm state.

5. The inductor driving device of claim 3, wherein the control circuit is further arranged to receive a voltage command and generate the control signal according to the voltage command, and the multiple alarm states comprise an alarm state in which a voltage corresponding to the voltage command exceeds a voltage range of the servomotor.

6. The inductor driving device of claim 3, wherein the multiple alarm states comprise an alarm state in which a rotor of the servomotor is blocked.

7. The inductor driving device of claim 3, wherein the multiple alarm states comprise an alarm state in which a temperature of the inductor driving device exceeds an operating temperature of the multiple switching elements.

8. The inductor driving device of claim 3, wherein the multiple alarm states comprise an alarm state in which a position command input to the servomotor is missing.

9. The inductor driving device of claim 1, wherein in the second mode, the control circuit changes the current direction of the inductor with 180-degree reversal repeatedly, to make the current direction of the inductor change between a positive direction and a negative direction alternately.

10. The inductor driving device of claim 1, wherein in the second mode, the control circuit keeps a duty cycle of the control signal unchanged.

11. The inductor driving device of claim 1, wherein each of the multiple audio signals is composed by a Morse code.

12. An inductor driving method, comprising:
    generating a control signal to control multiple switching elements; and
    driving an inductor according to switching of the multiple switching elements;
    wherein in a first mode, the control signal has a constant frequency; and in a second mode, a frequency of the control signal is adjusted and a current direction of the inductor is continuously changed, to generate one of multiple audio signals through the inductor.

13. The inductor driving method of claim 12, wherein the inductor is included in a servomotor.

14. The inductor driving method of claim 13, wherein an operating mode of the servomotor is initially the first mode; and the inductor driving method further comprises:
    in response to the servomotor being in one of multiple alarm states, switching the operating mode of the servomotor from the first mode to the second mode;
    wherein the multiple audio signals correspond to the multiple alarm states, respectively.

15. The inductor driving method of claim 14, further comprising:
    determining whether an alarm of the servomotor happens; and
    in response to the alarm of the servomotor occurring, determining which of the multiple alarm states an alarm state of the servomotor is, and generating an audio signal corresponding to the alarm state.

16. The inductor driving method of claim 14, further comprising:
    receiving a voltage command and generating the control signal according to the voltage command;
    wherein the multiple alarm states comprise an alarm state in which a voltage corresponding to the voltage command exceeds a voltage range of the servomotor.

17. The inductor driving method of claim 14, wherein the multiple alarm states comprise an alarm state in which a rotor of the servomotor is blocked.

18. The inductor driving method of claim 14, wherein the multiple alarm states comprise an alarm state in which a temperature of the inductor driving device exceeds an operating temperature of the multiple switching elements.

19. The inductor driving method of claim 14, wherein the multiple alarm states comprise an alarm state in which a position command input to the servomotor is missing.

20. The inductor driving method of claim 12, further comprising:
    in the second mode, changing the current direction of the inductor with 180-degree reversal repeatedly, to make the current direction of the inductor change between a positive direction and a negative direction alternately.

21. The inductor driving method of claim 12, further comprising:
    in the second mode, keeping a duty cycle of the control signal unchanged.

22. The inductor driving method of claim 12, wherein each of the multiple audio signals is composed by a Morse code.

23. An inductor driving device, comprising:
    multiple switching elements, wherein an inductor is driven according to switching of the multiple switching elements; and
    a control circuit, arranged to generate a control signal for controlling the multiple switching elements;
    wherein in a first mode, the control signal has a constant frequency; and in a second mode, the control circuit adjusts a frequency of the control signal, to generate one of multiple audio signals through the inductor;
    wherein each of the multiple audio signals is composed by a Morse code.

\* \* \* \* \*